(12) United States Patent
Honda (10) Patent No.: US 8,237,966 B2
(45) Date of Patent: Aug. 7, 2012

(54) PRINTING DEVICE AND COMPUTER-READABLE RECORD MEDIUM STORING PROGRAM FOR PRINTING DEVICE

(75) Inventor: Masato Honda, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 636 days.

(21) Appl. No.: 12/393,424

(22) Filed: Feb. 26, 2009

(65) Prior Publication Data

US 2009/0213426 A1 Aug. 27, 2009

(30) Foreign Application Priority Data

Feb. 26, 2008 (JP) ................. 2008-044646

(51) Int. Cl.
*G06K 15/00* (2006.01)
*G06F 3/12* (2006.01)
*H04N 1/32* (2006.01)
(52) U.S. Cl. ............ 358/1.15; 358/468; 358/1.16
(58) Field of Classification Search ............... 358/1.15, 358/443, 434, 448, 468, 1.9, 1.13, 400, 407; 707/530, 536, 732
See application file for complete search history.

(56) References Cited

U.S. PATENT DOCUMENTS

| | | | |
|---|---|---|---|
| 2001/0037372 A1 | 11/2001 | Tachi et al. | |
| 2002/0097414 A1* | 7/2002 | Utsunomiya | 358/1.13 |
| 2004/0246517 A1* | 12/2004 | Parry | 358/1.15 |
| 2005/0099653 A1 | 5/2005 | Kawaoka | |
| 2005/0198166 A1 | 9/2005 | Kawaji | |
| 2005/0219899 A1* | 10/2005 | Kishi et al. | 365/185.11 |
| 2006/0066889 A1 | 3/2006 | Asano et al. | |
| 2009/0116045 A1* | 5/2009 | Tran et al. | 358/1.9 |
| 2009/0273802 A1* | 11/2009 | Kajiyama | 358/1.15 |
| 2010/0076967 A1* | 3/2010 | Canora et al. | 707/732 |

FOREIGN PATENT DOCUMENTS

| | | |
|---|---|---|
| EP | 1134650 A2 | 9/2001 |
| EP | 1134650 A3 | 9/2001 |
| EP | 1318448 A2 | 6/2003 |
| JP | 11224190 A | 8/1999 |
| JP | 2000083109 A | 3/2000 |
| JP | 2000148613 A | 5/2000 |
| JP | 2001148613 A | 5/2000 |
| JP | 2001-188720 | 7/2001 |
| JP | 2001-282491 | 10/2001 |
| JP | 2001320506 A | 11/2001 |
| JP | 2002044290 A | 2/2002 |
| JP | 2003-067169 | 3/2003 |
| JP | 2004-102916 | 4/2004 |
| JP | 2004171169 A | 6/2004 |
| JP | 2005-004586 | 1/2005 |
| JP | 2005-166039 | 6/2005 |
| JP | 2006-100974 | 4/2006 |
| JP | 2006180558 A | 7/2006 |
| JP | 2007-125802 | 5/2007 |

OTHER PUBLICATIONS

Notification of Reasons for Rejection for Japanese Application No. 2008-044646, mailed Nov. 9, 2010.

(Continued)

*Primary Examiner* — Jerome Grant, II
(74) *Attorney, Agent, or Firm* — Banner & Witcoff, Ltd.

(57) ABSTRACT

A printing device comprises a communication unit which executes communication with a mail server on a network, a connection unit to which a portable storage medium can be connected, a printing unit which executes printing, and a control unit which executes a mail acquisition process of acquiring an e-mail including a body and an attached file from the mail server via the communication unit, printing the body with the printing unit, and storing the attached file in a portable storage medium connected to the connection unit.

13 Claims, 6 Drawing Sheets

OTHER PUBLICATIONS

Notification of Reasons of Rejection for Japanese Application No. 2008-044646, mailed Dec. 1, 2009.
Notification of First Office Action dated Dec. 27, 2010 in Chinese Application No. 2009-10008327.2 and English translation thereof.
Decision of Rejection for Japanese application No. 2008-044646 mailed Jun. 23, 2011.
Extended European search report for application No. 09002683.2 mailed Jun. 28, 2011.
Office Action received for Japanese Application 2008-044646 mailed Jun. 8, 2010.
CN Office Action dated Jan. 30, 2012 in corresponding Application No. 200910008327.2; English Translation.

* cited by examiner

MAIL ACQUISITION INFORMATION

| MAIL SERVER NAME (MAIL SERVER ADDRESS) |
| --- |
| USER ID |
| PASSWORD |
| MAIL ADDRESS |
| WHETHER E-MAILS IN MAIL SERVER MAY BE DELETED |
| WHETHER ACQUIRED E-MAILS MAY BE FORWARDED |
| FORWARDING DESTINATION/ADDRESS (FAX NUMBER, MAIL ADDRESS, ETC.) |
| FIXED TEXT DATA TO BE USED FOR FORWARDING |
| FILTER INFORMATION (E-MAIL ACQUISITION TIME, E-MAIL IDENTIFICATION INFORMATION, ETC.) |

PRINTING DEVICE AND COMPUTER-READABLE RECORD MEDIUM STORING PROGRAM FOR PRINTING DEVICE

CROSS-REFERENCE TO RELATED APPLICATION

This application claims priority under 35 U.S.C. §119 from Japanese Patent Application No. 2008-044646 filed on Feb. 26, 2008. The entire subject matter of the application is incorporated herein by reference.

BACKGROUND

1. Technical Field

The present invention relates to a printing device, and in particular, to a printing device having the function of taking in an e-mail from outside. The present invention relates also to a computer-readable record medium storing a program for such a printing device.

2. Prior Art

In a widely known technique for a computer connected to a network (intranet, Internet, etc.), the user of the computer is allowed to acquire his/her e-mail from a mail server on the network (by making the computer take in the e-mail) and view the contents of the acquired e-mail on the computer by use of mail client software. When a printer available to the computer exists on the network, the contents of the acquired e-mail can also be printed out by use of the printer.

Meanwhile, in another widely known technique, a printer connected to a network directly (not via a computer) takes in an e-mail stored in a mail server and prints out the contents of the acquired e-mail in response to a user operation. For example, in a technique described in Japanese Patent Provisional Publication No. 2001-282491, setting information, such as a user ID and a password corresponding to a mail account registered in the mail server, is previously stored in a storage medium inside the printer, and for the printing of an e-mail, the printer acquires the e-mail by making access to the mail server using the setting information, by which an e-mail can be printed out with ease (not through a computer).

SUMMARY OF THE INVENTION

Incidentally, an e-mail can include not only the body but also an attached file. There are various types of attached files such as files in printable formats (ordinary text file, image data file, etc.) and files that should be used on a computer (e.g. program file). However, the processing of attached files has not been considered closely in the aforementioned techniques and further enhancement of convenience is being required.

The present invention, which has been made in consideration of the situation described above, is advantageous in that a printing device, capable of enhancing the convenience when an e-mail with an attached file is acquired, can be provided. The present invention also provides a computer-readable record medium storing a program for implementing such a printing device.

In accordance with an aspect of the present invention, there is provided a printing device comprising a communication unit which executes communication with a mail server on a network, a connection unit to which a portable storage medium can be connected, a printing unit which executes printing, and a control unit which executes a mail acquisition process of acquiring an e-mail including a body and an attached file from the mail server via the communication unit, printing the body with the printing unit, and storing the attached file in a portable storage medium connected to the connection unit.

With the printing device configured as above, an e-mail including a body and an attached file is acquired from a mail server, the body is printed out with the printing unit, and the attached file is stored in a portable storage medium connected to the connection unit. There are cases where an attached file is of an unprintable type or the user wants to use the attached file on a computer later. The convenience for the user is enhanced by the storing of the attached file in a portable storage medium.

In accordance with another aspect of the present invention, there is provided a computer-readable record medium storing computer-readable instructions that cause a computer of a printing device (equipped with a communication unit capable of communication via a network, a connection unit to which a portable storage medium can be connected, and a printing unit capable of executing printing) to execute an e-mail acquisition step of acquiring an e-mail including a body and an attached file from a mail server on the network via the communication unit, a body printing step of printing the body with the printing unit, and an attached file storing step of storing the attached file in a portable storage medium connected to the connection unit.

By making a computer of a printing device operate according to the computer-readable instructions acquired (loaded, installed, etc.) from the computer-readable record medium, effects similar to those of the printing device described above can be achieved.

Other objects, features and advantages of the present invention will become more apparent from the consideration of the following detailed description taken in conjunction with the accompanying drawings.

DETAILED DESCRIPTION OF THE EMBODIMENT

Referring now to the drawings, a description will be given in detail of a preferred embodiment in accordance with the present invention.

1. Exterior Configuration of Printer

Figure 1:
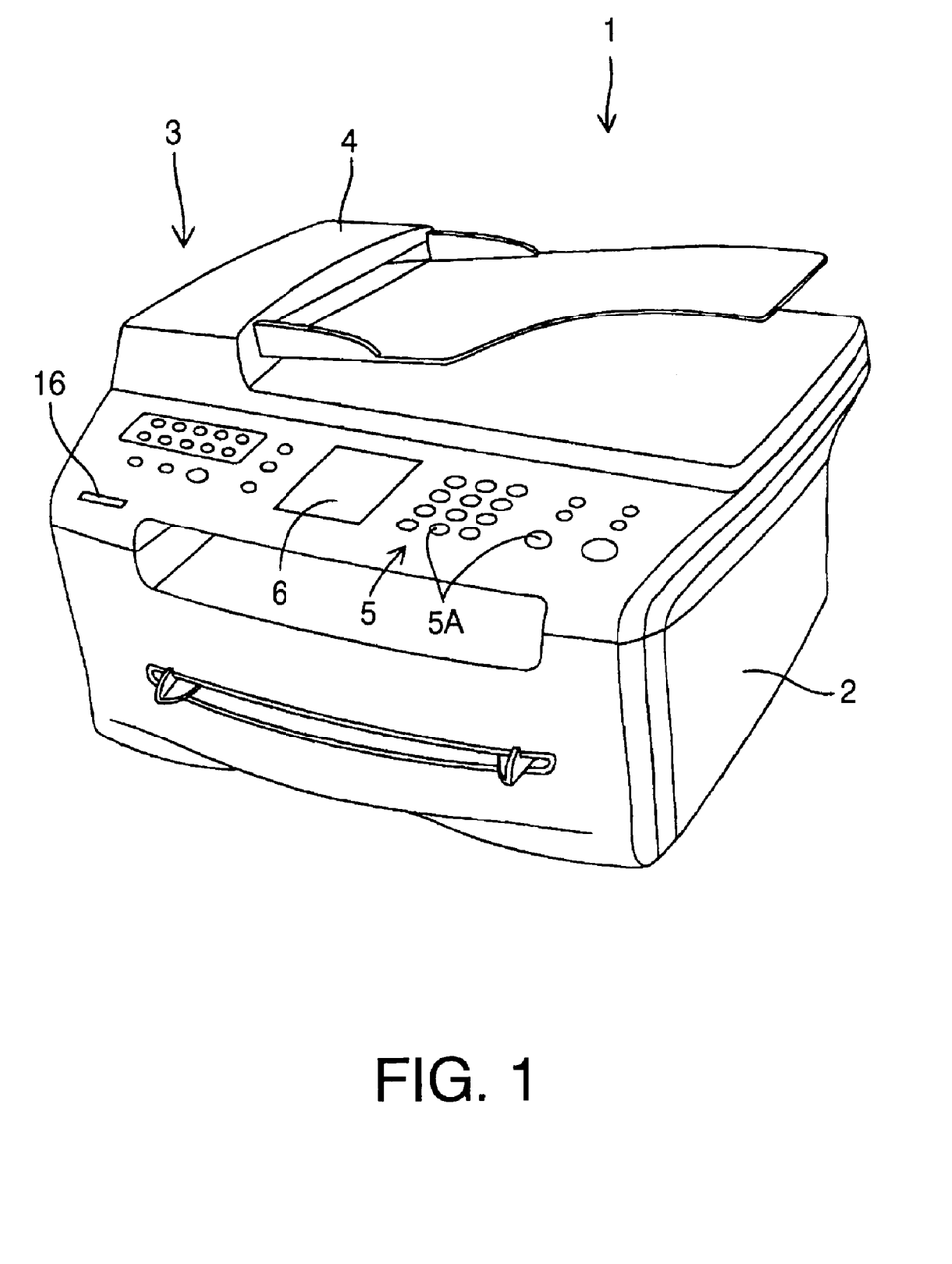
FIG. 1 is an external perspective view of a printer as an example of a printing device in accordance with an embodiment of the present invention.

FIG. 1 is an external perspective view of a printer 1 as an example of a printing device in accordance with an embodiment of the present invention. The printer 1 in this embodiment is configured as an MFP (Multi-Function Peripheral) having the printer function, scanner function, copy function, facsimile function, etc.

As shown in FIG. 1, a scanner unit 3 for scanning a document is provided at the top of the main unit 2 of the printer 1. The scanner unit 3 scans a document placed on a document scanning surface (unshown) with an image sensor (unshown) such as a CIS (Contact Image Sensor) and outputs image data obtained by the scanning. Above the document scanning surface, an ADF (Automatic Document Feeder) 4 is placed to be openable and closable with respect to the document scanning surface. The ADF 4 feeds a document placed thereon by the user to a position on the document scanning surface where the scanning by the image sensor is possible.

A front part of the top of the printer 1 is equipped with an operation unit 5, a display unit 6 and a USB interface 16. The operation unit 5 includes multiple buttons 5A, through which the user can make various inputs. The display unit 6, including a liquid crystal display, lamps, etc., is capable of displaying the operating status of the printer 1, setting screens, etc.

2. Electrical Configuration

Figure 2:
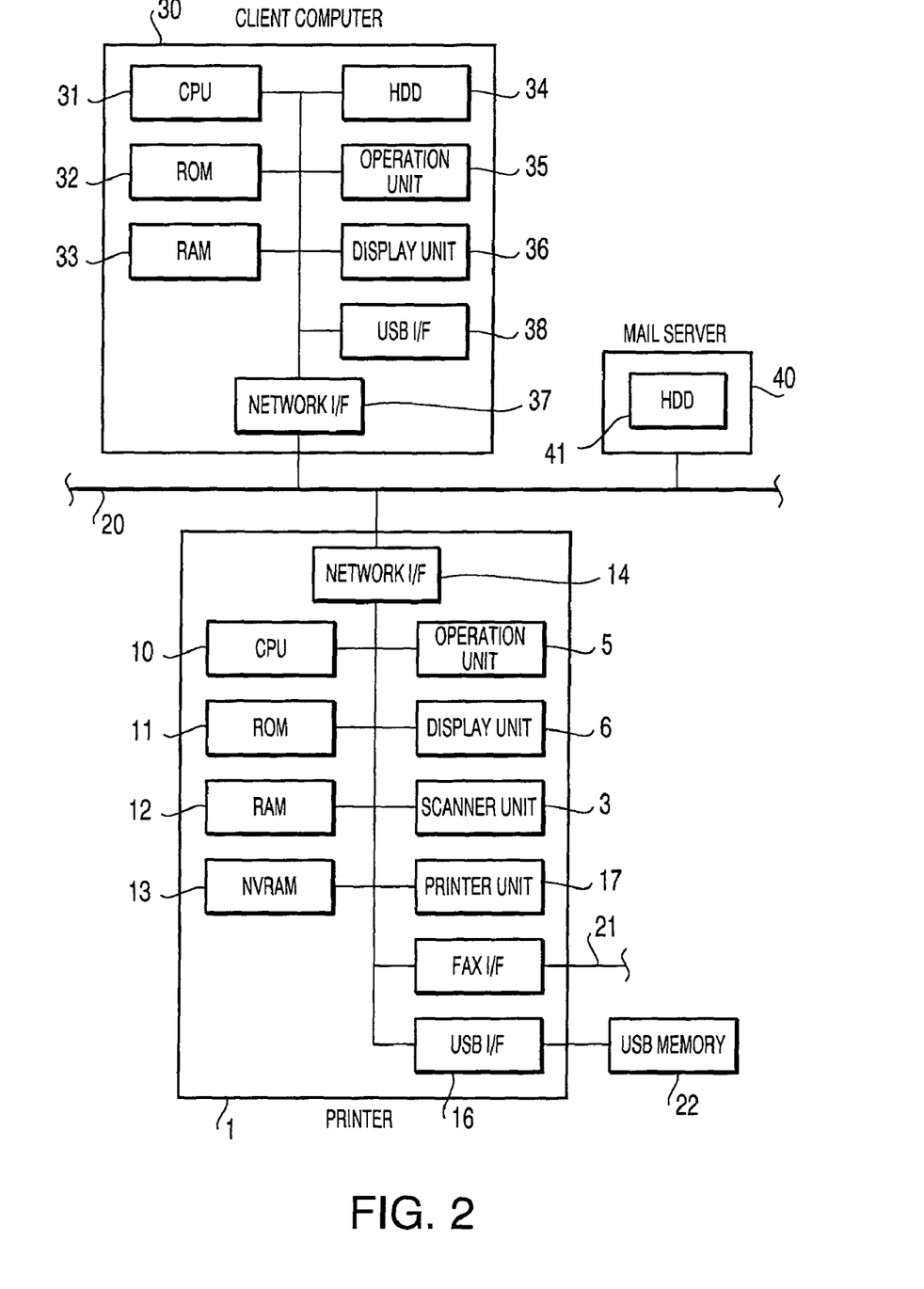
FIG. 2 is a block diagram schematically showing the electrical configuration of the printer and a network system to which the printer is connected.

FIG. 2 is a block diagram schematically showing the electrical configuration of the printer 1 and a network system to which the printer 1 is connected. As shown in FIG. 2, the printer 1 includes a CPU (Central Processing Unit) 10, a ROM (Read Only Memory) 11, a RAM (Random Access Memory) 12, an NVRAM (Nonvolatile RAM) 13, a network interface 14, a facsimile interface 15, a USB interface 16, a printer unit 17, the scanner unit 3, the operation unit 5, the display unit 6, etc.

The ROM 11 is a read only memory storing a program for controlling various operations of the printer 1 such as a memory handling process which will be explained later. The CPU 10 controls the components of the printer 1 by executing various processes according to the program loaded from the ROM 11 while storing results of the processes in the RAM 12 and the NVRAM 13.

The network interface 14, which is connected to a network 20 (intranet, Internet, etc.), implements data communication with a client computer 30, a mail server 40, etc. connected to the network 20. The facsimile interface 15, which is connected to a telephone circuit 21, implements facsimile data communication with an external facsimile machine, etc.

The USB interface 16, to which a USB device (USB memory 22 (portable storage medium), digital camera, etc.) can be connected in a detachable manner, implements data communication with the USB device. The printer unit 17 is a unit for printing an image on a print medium (e.g. a sheet such as paper) according to print data.

The client computer 30 includes a CPU 31, a ROM 32, a RAM 33, an HDD (Hard Disk Drive) 34, an operation unit 35 (including a keyboard, pointing device, etc.), a display unit 36 (implemented by a liquid crystal display, for example), a network interface 37 (connected to the network 20), a USB interface 38, etc. In the HDD 34, various programs (program for executing a memory setting process (explained later), printer driver, etc.) have been stored.

The mail server 40 has the function of transmitting and receiving e-mails by use of protocols such as POP (Post Office Protocol) and SMTP (Simple Mail Transfer Protocol). The mail server 40, which is equipped with an HDD 41, stores received e-mails in corresponding mail boxes (each for each mail account registered in the mail server 40) reserved in the HDD 41.

3. Memory Setting Process

Figure 3:
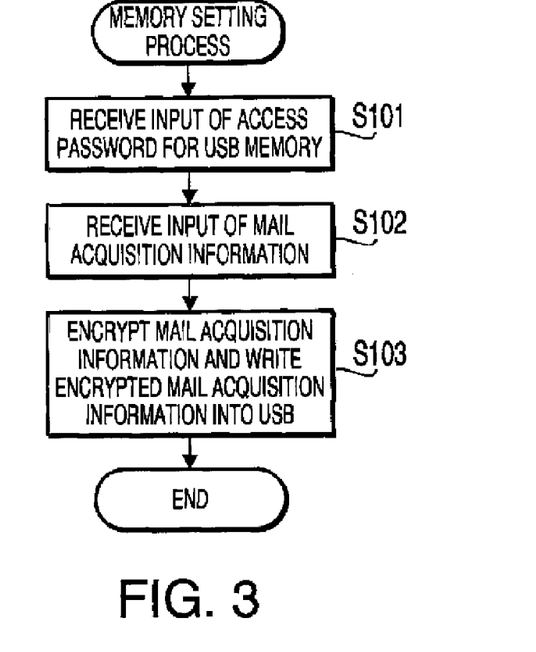
FIG. 3 is a flow chart showing the process flow of a memory setting process which is executed by a client computer connected to the printer.
Figure 4:
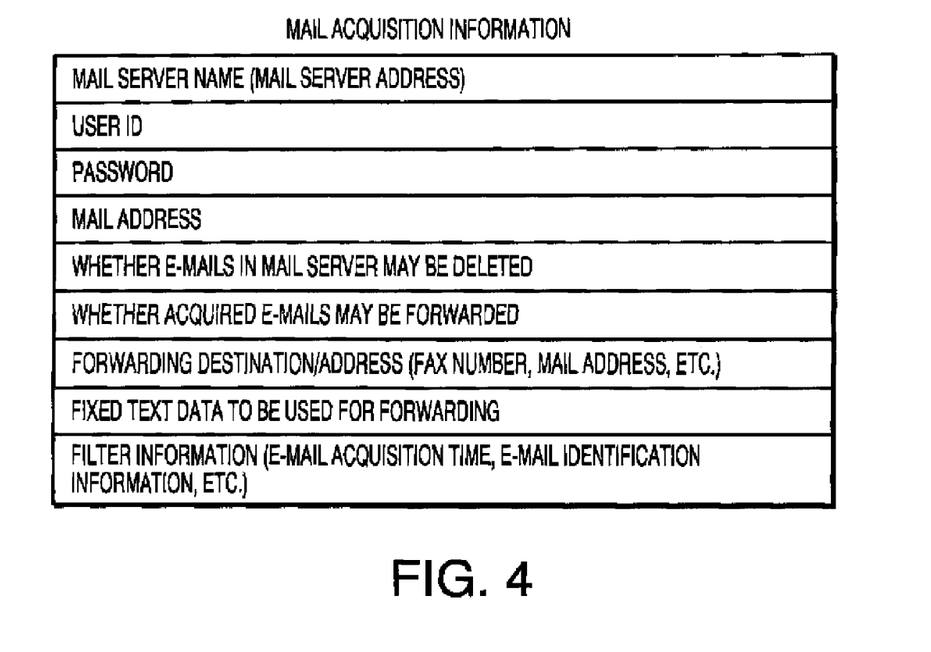
FIG. 4 is a table showing an example of items of mail acquisition information which is stored in a USB memory attached to the printer.

Next, the aforementioned memory setting process, which is executed by the client computer 30 under the control of the CPU 31, will be explained. FIG. 3 is a flow chart showing the process flow of the memory setting process. FIG. 4 is a table showing an example of items of mail acquisition information which is stored in the USB memory 22.

The memory setting process is executed by the client computer 30 for previously storing the mail acquisition information (to be used in a mail acquisition process which will be explained later) in the USB memory 22. The CPU 31 of the client computer 30 starts the memory setting process when the USB memory 22 (before storing the mail acquisition information) is attached to the USB interface 38 and an instruction for executing the memory setting process is inputted by the user through the operation unit 35.

As shown in FIG. 3, the CPU 31 starting the memory setting process displays an access password input screen on the display unit 36 and thereby acquires an access password which is inputted by the user through the operation unit 35 (S101). The access password inputted in this step will be used later as a decryption key which is necessary for access to a file that has been stored in the USB memory 22 after being encrypted.

Subsequently, the CPU 31 displays a mail acquisition information input screen on the display unit 36 and thereby acquires set values of the items of the mail acquisition information which are inputted by the user through the operation unit 35 (S102). The mail acquisition information includes a set of set values of the items in regard to the operation of the printer 1 in the mail acquisition process. Multiple sets of mail acquisition information, each for each mail account, can be stored in one USB memory 22.

The items of the mail acquisition information can include, for example, a mail server name (or mail server address), user ID, password, mail address, information indicating whether e-mails in the mail server 40 may be deleted or not, information indicating whether acquired e-mails may be forwarded or not, forwarding destination/address (FAX number, mail address, etc.), fixed text data (data of fixed text (boilerplate) to be used for the forwarding of e-mails), etc. corresponding to a mail account (details will be explained later). Besides the above items into which desired set values are written by the user, the mail acquisition information can include other items such as filter information (e-mail acquisition date/time, e-mail identification information, etc.), into which values are written during the execution of the mail acquisition process by the printer 1.

Subsequently, the CPU 31 generates a file by encrypting the inputted mail acquisition information, writes the generated file into the USB memory 22 via the USB interface 38 (S103), and ends the memory setting process of FIG. 3. The encrypted file of the mail acquisition information can be decrypted by use of the access password inputted by the user as mentioned above. Therefore, it is also possible to make the client computer 30 execute (separately from the above memory setting process) a process for letting the user input the access password for the USB memory 22 (which has already stored the mail acquisition information) and allowing the user inputting the correct access password to change the contents of the mail acquisition information stored in the USB memory 22.

Incidentally, while the above memory setting process (FIG. 3) is executed by the client computer 30 in this embodiment, the printer 1 may also be configured to execute a process equivalent to the memory setting process. In this case, the printer 1 under the control of the CPU 10 receives the user's input of the mail acquisition information through the operation unit 5, encrypts the inputted mail acquisition information, and writes the encrypted mail acquisition information into the USB memory 22 connected to the USB interface 16.

4. Memory Handling Process

Figure 5:
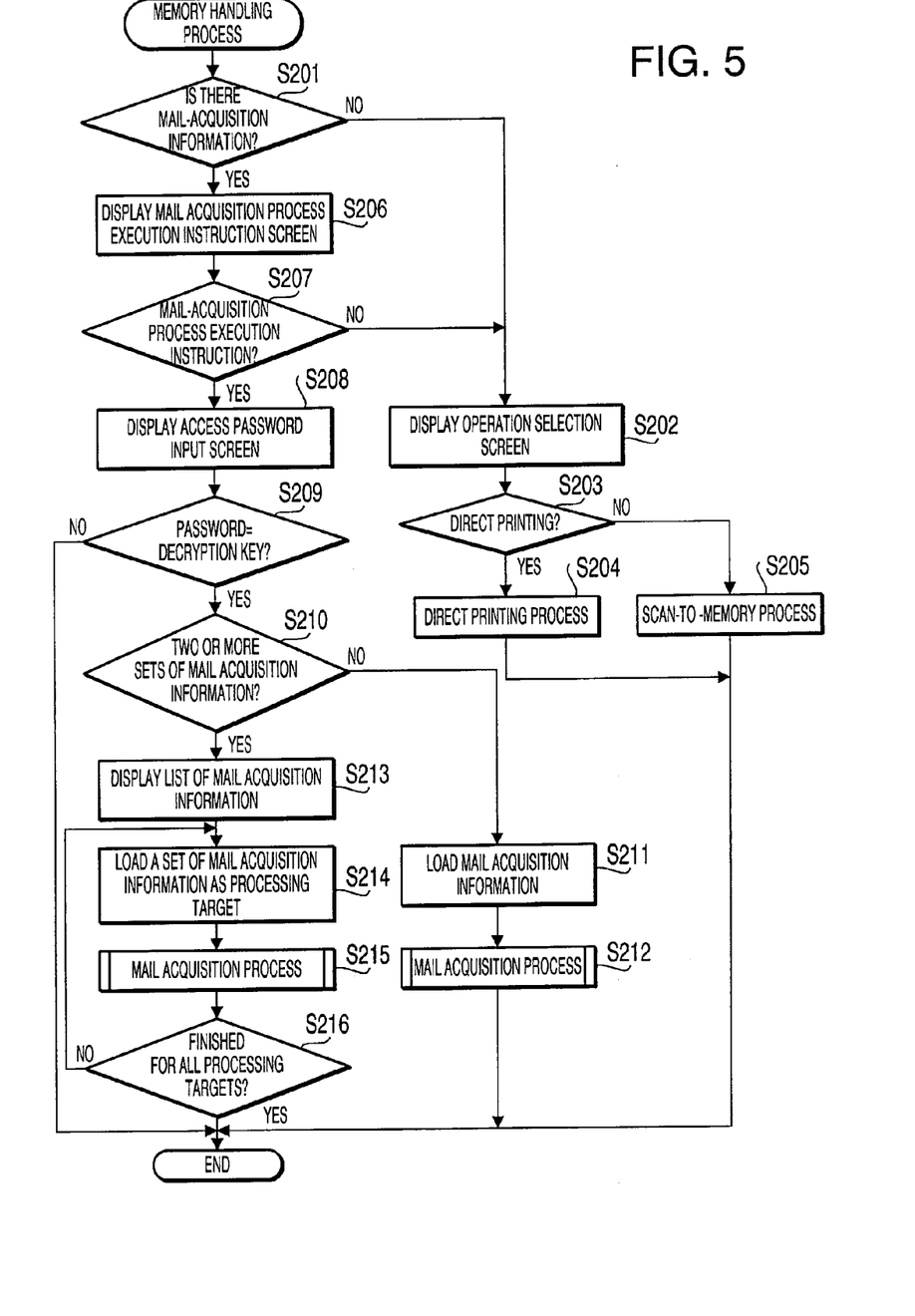
FIG. 5 is a flow chart showing the process flow of a memory handling process which is executed by the printer.

Next, the memory handling process which is executed by the printer 1 will be explained. FIG. 5 is a flow chart showing the process flow of the memory handling process. In the memory handling process, the printer 1 executes steps in regard to the USB memory 22 connected to the USB interface 16.

The CPU 10 of the printer 1 starts the memory handling process when connection of a USB memory 22 to the USB interface 16 (not being used) is detected. As shown in FIG. 5, the CPU 10 starting the memory handling process checks whether mail acquisition information has already been stored in the USB memory 22 or not (S201). When no mail acquisition information has been stored in the USB memory 22 (S201: NO), the CPU 10 displays an operation selection screen on the display unit 6 (S202). For example, the names of processes related to the USB memory 22 (except the mail acquisition process which will be explained later), such as "DIRECT PRINTING" and "SCAN TO MEMORY", are displayed on the screen as options. The user can input an execution instruction (instruction for executing one of the processes) by selecting one of the options on the screen through the operation unit 5.

When "DIRECT PRINTING" is selected by the user from the options displayed on the operation selection screen (S203: YES), the CPU 10 executes a direct printing process (S204), in which the CPU 10 reads out an image data file specified by the user from the USB memory 22, generates print data based on the file, and makes the printer unit 17 execute printing according to the print data. When "SCAN TO MEMORY" is selected by the user from the options displayed on the operation selection screen (S203: NO), the CPU 10 executes a scan-to-memory process (S205), in which the CPU 10 makes the scanner unit 3 scan a document placed thereon, generates an image data file based on image data obtained by the scanning, and stores the image data file in the USB memory 22.

When a file of the mail acquisition information has already been stored in the USB memory 22 in S201 (S201: YES), the CPU 10 displays a selection screen, for letting the user select whether the mail acquisition process should be executed or not, on the display unit 6 (S206). When the execution of the mail acquisition process is not selected by the user through the operation unit 5 (S207: NO), the CPU 10 advances to step S202 and executes a process other than the mail acquisition process.

On the other hand, when the execution of the mail acquisition process is selected by the user, that is, when an instruction for executing the mail acquisition process is inputted by the user (S207: YES), the CPU 10 displays an access password input screen on the display unit 6 (S208). When an access password is inputted by the user through the operation unit 5, the CPU 10 judges whether or not the inputted access password coincides with the decryption key for an encrypted file (S209). When the inputted access password coincides with no decryption key (S209: NO), the CPU 10 ends the memory handling process of FIG. 5.

When the inputted access password coincides with the decryption key for an encrypted file (S209: YES), the CPU 10 judges whether there exist two or more sets of mail acquisition information in the USB memory 22 (S210). When there exists only one set of mail acquisition information in the USB memory 22 (S210: NO), the CPU 10 loads the set of mail acquisition information from the USB memory 22 using the access password inputted by the use (S211) and executes the mail acquisition process (explained later) by use of the loaded mail acquisition information (S212).

On the other hand, when there exist two or more sets of mail acquisition information in the USB memory 22 (S210: YES), the CPU 10 displays a list of all sets of mail acquisition information (stored in the USB memory 22) on the display unit 6 (S213). For example, selected items (mail addresses, etc.) included in the sets of mail acquisition information are displayed in list display. The user can select one or more sets of mail acquisition information (as processing targets of the mail acquisition process) from the list by operating the operation unit 5.

Subsequently, the CPU 10 loads an unprocessed set of mail acquisition information (included in the one or more sets of mail acquisition information selected by the user as the processing targets) (S214) and executes the mail acquisition process (explained later) by use of the loaded set of mail acquisition information (S215). Thereafter, the CPU 10 judges whether the mail acquisition process has been finished for all sets of mail acquisition information as the processing targets (S216). When there remains an unprocessed set of mail acquisition information (S216: NO), the CPU 10 returns to the step S214 and executes the mail acquisition process for the unprocessed set of mail acquisition information. When the mail acquisition process has been finished for all the processing targets (S216: YES), the CPU 10 ends the memory handling process of FIG. 5.

5. Mail Acquisition Process

Figure 6:
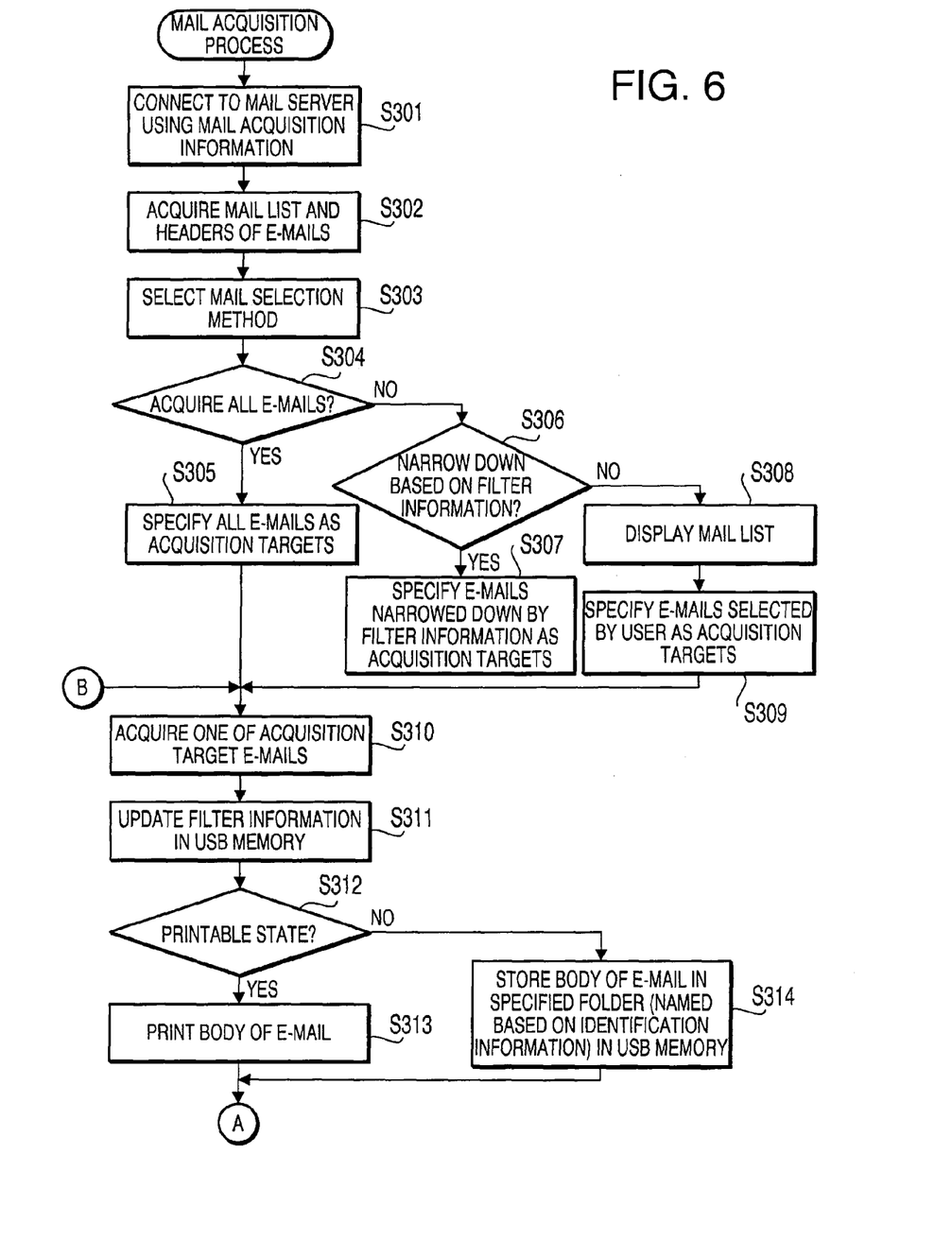
FIGS. 6 and 7 are flow charts showing the process flow of a mail acquisition process which is executed by the printer during the execution of the memory handling process.
Figure 7:
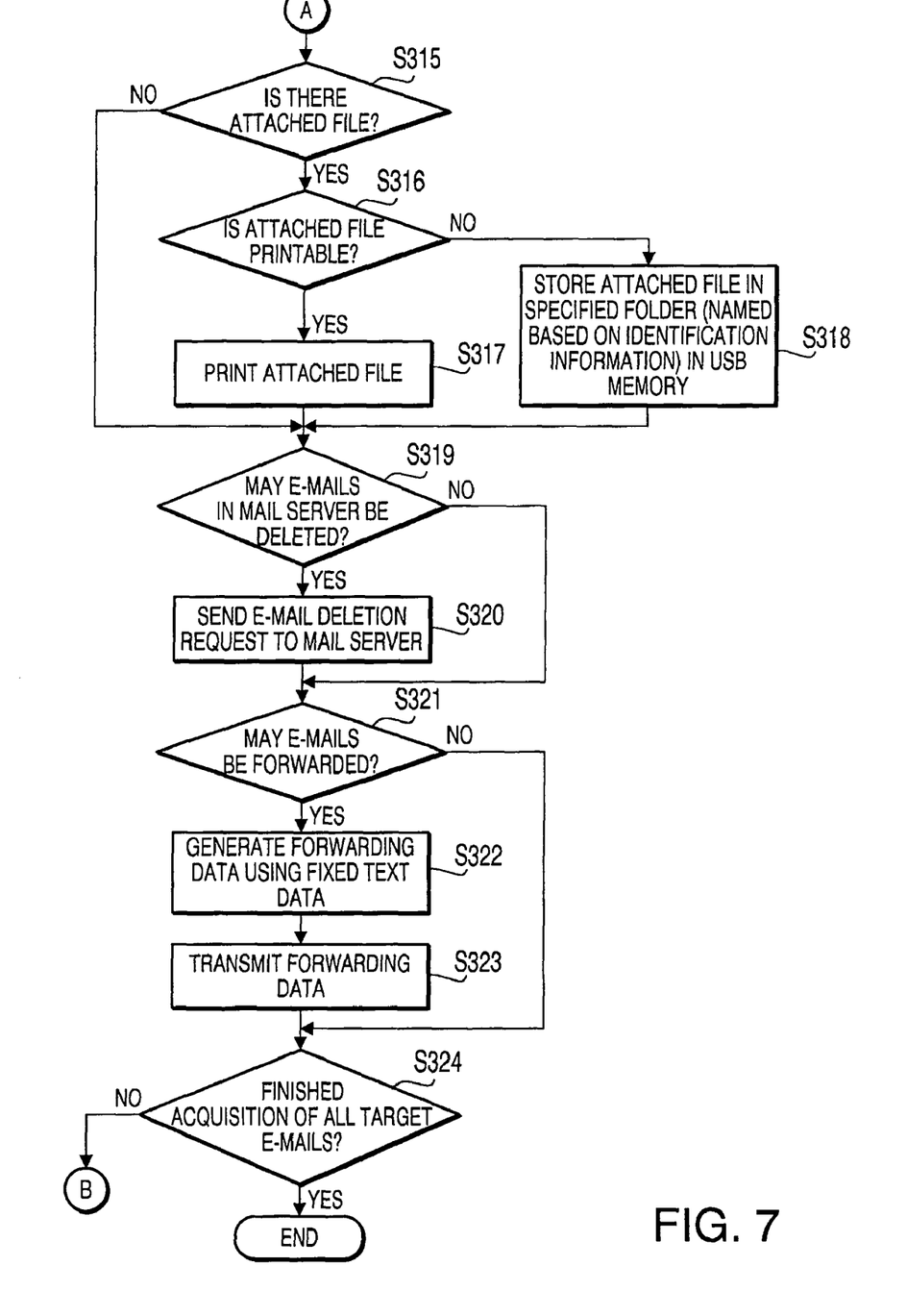

Next, the mail acquisition process, which is executed by the printer 1 during the execution of the above memory handling process, will be explained. FIGS. 6 and 7 are flow charts showing the process flow of the mail acquisition process. In the mail acquisition process, the printer 1 acquires e-mails from the mail server 40 by communicating with the mail server 40 according to POP (Post Office Protocol), and executes printing, storing, etc. of the acquired e-mails.

As shown in FIGS. 6 and 7, the CPU 10 starting the mail acquisition process makes a connection to the mail server 40 by use of the loaded mail acquisition information (S301). Specifically, the printer 1 (CPU 10) first transmits a port connection request to the mail server 40 (specified by the mail acquisition information) via the network interface 14. In response to the port connection request, the mail server 40 sends back an OK message, by which the communication between the printer 1 and the mail server 40 by TCP/IP is established. Then, the printer 1 successively transmits the user ID and the password included in the mail acquisition information to the mail server 40. By an OK message which is sent back from the mail server 40 in reply, the user authentication for the mail box is completed.

Subsequently, the CPU 10 acquires a list of e-mails accumulated in the mail box and the headers of the e-mails (S302). Specifically, the printer 1 (CPU 10) first transmits a request for mail box list information to the mail server 40. In response to the request, the mail server 40 sends back a list including the number of e-mails in the mail box and size information on every e-mail. Then, the printer 1 transmits a request for the header in regard to all the e-mails in the mail box, and the mail server 40 sends back the headers of the e-mails. Incidentally, the header of each e-mail includes the mail addresses of the sender (From) and the destination (To), subject line (Subject), transmission date/time (Date), identification number (Message-ID), media type (Content-Type), etc.

Subsequently, the CPU 10 displays a screen, for letting the user select a method of e-mail selection (e-mail acquisition) from the mail box, on the display unit 6 (S303). For example, three options: acquiring all e-mails from the mail box, narrowing down e-mails to be acquired from the mail box based on the filter information included in the mail acquisition information, and acquiring e-mails selected by the user by manual operation, are displayed. When an input selecting the acquisition of all e-mails from the mail box is made by the user through the operation unit 5 (S304: YES), the CPU 10 specifies all the e-mails included in the list as the targets of acquisition.

Meanwhile, when the narrowing down of the e-mails to be acquired from the mail box based on the filter information is selected by the user (S306: YES), the CPU 10 selects e-mails satisfying prescribed conditions from the e-mails in the list by use of the filter information, and specifies the selected e-mails as the acquisition targets. Specifically, it is possible, for example, to prestore the date/time of the last (latest) e-mail acquisition in the filter information included in the mail acquisition information in the USB memory 22 and select (specify) e-mails in the list whose transmission date/time (Date) is after the last e-mail acquisition date/time (indicated by the filter information) as the acquisition targets.

It is also possible to prestore identification information (subject line, transmission date/time, identification number, etc.) on every already-acquired e-mail in the USB memory 22 as the filter information, select e-mails that have not been acquired yet from the e-mails in the list by referring to the identification information, and specify the selected e-mails as the acquisition targets.

When the acquisition of e-mails selected by the user's manual operation is selected in S303 (S306: NO), the CPU 10 displays a list of the subject lines, senders, etc. of all the e-mails in the mail box on the display unit 6 (S308), and specifies one or more e-mails selected by the user (from the e-mails in the list by operating the operation unit 5) as the acquisition targets (S309).

After S305, S307 or S309, the CPU 10 selects one unacquired e-mail from the e-mails specified as the acquisition targets in S305, S307 or S309 and transmits a mail data request regarding the selected e-mail to the mail server 40 (S310). In response to the request, the mail server 40 sends back mail data of the acquisition target e-mail (including the header and the body of the e-mail (and data of an attached file if any)). The CPU 10 of the printer 1 receiving the mail data stores the received mail data in the RAM 12.

Subsequently, the CPU 10 updates the filter information in the mail acquisition information stored in the USB memory 22 (S311). Specifically, in cases where the e-mail acquisition date/time is used as the filter information, for example, the CPU 10 writes the current date/time to the USB memory 22 as the value of the filter information. In cases where the e-mail identification information is used as the filter information, the CPU 10 adds the identification information on the acquired e-mail (subject line, transmission date/time, identification number, etc) to the filter information stored in the USB memory 22.

Subsequently, the CPU 10 judges whether or not the printer 1 is in a state in which the printing is possible (S312). When the printer 1 is currently capable of executing the printing normally (S312: YES), the CPU 10 executes the printing of the body of the e-mail (S313). Specifically, the CPU 10 generates print data by rasterizing the data (text data) of the body and part of the header (sender, subject line, etc.) of the e-mail and makes the printer unit 17 print an image according to the print data on a sheet.

On the other hand, when the CPU 10 judges that the printer 1 is in a state in which the printing is impossible due to abnormality such as exhaustion of paper or toner/ink (S312: NO), the CPU 10 generates a file including the body and part of the header of the e-mail and stores the generated file in the USB memory 22 (S314). The file including the body may be a file in the text format, an image data file (TIFF, etc.) generated by imaging the text, etc.

In the storing of the file in the USB memory 22, the CPU 10 creates a folder having a folder name based on identification information on the e-mail to be stored in the USB memory 22, and stores the file in the folder named based on the identification information. The folder name can be generated by use of the subject line, sender, transmission date/time or acquisition date/time (e.g. "030108") of the e-mail, a combination of such items, or a combination of such items and a specific word (e.g. "mail"), for example. Incidentally, it is possible to let the user specify the folder for storing the file and/or the rules for the naming of the folder for storing the file.

After S313 or S314, the CPU 10 judges whether the acquired e-mail includes an attached file or not (S315). When the acquired e-mail includes an attached file (S315: YES), the CPU 10 judges whether the attached file is printable or not (S316). Specifically, the CPU 10 checks the header of the attached file and thereby judges whether or not the attached file is a file in a printable format (text data, printable image data (GIF, JPEG, etc.), etc.). When the attached file is printable (S316: YES), the CPU 10 generates print data by rasterizing the attached file and makes the printer unit 17 print an image according to the print data on a sheet (S317).

On the other hand, when the attached file is judged not to be a file in a printable format (e.g. when the attached file is an application program) (S316: NO), the CPU 10 stores the attached file in the USB memory 22 (S138). In this step, the CPU 10 stores the attached file in a folder having a folder name based on the identification information on the e-mail including the attached file, similarly to the aforementioned step S314 for storing of the body of the e-mail.

After the printing of the attached file (S317) or the storing of the attached file in the USB memory 22 (S318) or when the e-mail includes no attached file (S315: NO), the CPU 10 checks whether or not the item (information) in the loaded mail acquisition information indicating whether e-mails in the mail server 40 may be deleted or not specifies that the e-mails may be deleted (S319). When the item specifies that the e-mails may be deleted (S319: YES), the CPU 10 transmits an e-mail deletion request regarding the currently processed e-mail to the mail server 40 (S320). In response to the e-mail deletion request, the mail server 40 deletes the e-mail from the mail box in the HDD 41. On the other hand, when the item specifies that the e-mails in the mail server 40 may not be deleted (S319: NO), the CPU 10 skips the transmission of the e-mail deletion request (S320), by which the e-mail acquired by the printer 1 is retained in the mail server 40 even after the mail acquisition process.

Subsequently, the CPU 10 checks whether or not the item (information) in the loaded mail acquisition information indicating whether acquired e-mails may be forwarded or not specifies that the e-mails may be forwarded (S321). When the item specifies that the e-mails may be forwarded (S321: YES), the CPU 10 generates forwarding data based on the currently processed e-mail (S322). The method for forwarding the e-mail includes e-mail transmission and facsimile transmission. When the forwarding destination/address included in the mail acquisition information is a mail address, the CPU 10 generates the forwarding data in the e-mail format. When the forwarding destination/address in the mail acquisition information is a FAX number, the CPU 10 generates the forwarding data as facsimile data.

The forwarding data is generated by combining the original e-mail data with the fixed text data included in the mail acquisition information. In the case of the forwarding data in the e-mail format, a description indicating that the forwarding data is for the forwarding of an e-mail acquired by the printer 1, the signature of the forwarder, etc. are added as the fixed text data to the body, subject line, etc. of the original e-mail. In the case of the forwarding data as facsimile data, text obtained by adding the description (indicating that the forwarding data is for the forwarding of an e-mail acquired by the printer 1), the signature of the forwarder, etc. to the body, subject line, etc. of the e-mail is imaged (converted into image data).

Subsequently, the CPU 10 carries out the forwarding of the generated forwarding data (S323). In the case of the forwarding data in the e-mail format, the CPU 10 communicates with the mail server 40 via the network interface 14 according to SMTP and transmits the forwarding data (e-mail) to the mail server 40 while specifying the forwarding destination/address included in the mail acquisition information (mail address) as the destination of the forwarding. The mail server 40 receiving the forwarding data transmits (forwards) the forwarding data (e-mail) to the specified destination (mail address). In the case of the forwarding data as facsimile data, the CPU 10 executes facsimile communication with the forwarding destination included in the mail acquisition information (FAX machine having the FAX number) via the facsimile interface 15 and transmits (forwards) the forwarding data (facsimile data) to the forwarding destination.

After finishing the transmission of the forwarding data (S323) or when the e-mail forwarding has been prohibited in the item in the mail acquisition information (S321: NO), the CPU 10 judges whether the e-mail acquisition has been finished for all the e-mails specified as the acquisition targets in S305, S307 or S309 (S324). When the e-mail acquisition has not been finished for all the acquisition target e-mails (S324: NO), the CPU 10 returns to the step S310 in FIG. 6 and acquires another unacquired e-mail. When the e-mail acquisition is finished for all the acquisition target e-mails (S324: YES), the CPU 10 ends the mail acquisition process of FIGS. 6 and 7.

6. Effects of Embodiments

As described above, with the printer 1 in accordance with the embodiment of the present invention, an e-mail including a body and an attached file is acquired from a mail server 40, the body is printed out with the printer unit 17, and the attached file is stored in a USB memory 22 connected to the USB interface 16. There are cases where an attached file is of an unprintable type or the user wants to use the attached file on a computer later. The convenience for the user is enhanced by the storing of the attached file in a USB memory 22.

Further, the printer 1, which is capable of the so-called direct printing (printing image data in the USB memory 22 not via the client computer 30), offers high usability to the user. The direct printing function can be realized without the need of adding a new configuration to the original configuration used for the e-mail acquisition and printing (USB interface 16, printer unit 17, etc.).

The printer 1 starts at least part of the mail acquisition process in response to the connection of the USB memory 22 to the printer 1 as a trigger. Incidentally, steps in this embodiment from the displaying of the mail acquisition process execution instruction screen (selection screen) to the completion of the mail acquisition process (S206-S216) can be regarded as the mail acquisition process in a broader meaning. Therefore, at least part of steps originally necessary (the input of an instruction for starting the mail acquisition process by the user, the input of user authentication information, etc.) can be left out, by which the convenience for the user is increased. Especially in this embodiment, the steps for the mail acquisition process are started on condition that a USB memory 22 is connected to the USB interface 16 and the mail acquisition information has been stored in the USB memory 22. Thus, the probability that the printer operates along the user's intention is high.

When the body or the attached file of an e-mail is stored in the USB memory 22 as a file, the file is stored in a folder named based on the identification information on the e-mail (reception date/time, title, etc.), by which the user referring to the contents of the USB memory 22 later is allowed to easily identify the particular e-mail by the folder name.

There are cases where an acquired e-mail can not be printed for some reason (e.g. exhaustion of paper or toner/ink). In such cases, the printer 1 is capable of taking the alternative measure of storing the body of the acquired e-mail in the USB memory 22, which enhances the user convenience.

In cases where an acquired attached file is printable, the attached file is printed out to let the user check its contents, by which the user convenience is increased.

The user can select whether e-mails already acquired may be deleted from the mail server 40 or not. By leaving already acquired e-mails in the mail server 40, it remains possible to load (download) the e-mails into the client computer 30, etc. and view the e-mails on the client computer 30, etc. Incidentally, while the user's selection (on whether already acquired e-mails may be deleted from the mail server 40 or not) is stored in the USB memory 22 as an item of the mail acquisition information and the value of the item representing the selection is inputted to the printer 1 via the USB interface 16 in this embodiment, it is also possible to let the user manually input the selection through the operation unit 5 of the printer 1 in the mail acquisition process.

The printer 1 acquires e-mails from a mail server 40 on a network by use of the mail acquisition information (setting information) stored in a USB memory 22 (mail server name (mail server address), user ID and password in this embodiment) and prints out the acquired e-mails. By storing at least part of the setting information (necessary for the e-mail acquisition) in the USB memory 22, it becomes unnecessary to store the setting information in the printer 1, by which the security can be enhanced.

Suppose the setting information necessary for the e-mail acquisition has to be directly (manually) inputted through the operation unit 5, the user has to input the setting information to each printer in cases where the user wants to acquire e-mails via two or more printers, which is troublesome to the user. In this embodiment described above, once the setting information is stored in a USB memory 22, the user can load the setting information into each printer by just connecting the USB memory 22 to the printer. Thus, the trouble of inputting the setting information can be lessened considerably.

The mail acquisition process can be executed for each of multiple sets of setting information (mail acquisition information) stored in the USB memory 22. Thus, when a user is using two or more mail accounts or managing e-mails of two or more people, for example, necessary tasks (e-mail acquisition, printing and storage in the USB memory 22) corresponding to each piece of setting information can be carried out at once, which is highly efficient.

In the e-mail acquisition, the e-mails to be acquired are selected based on the filter information stored in the USB memory 22. The selection makes it possible to acquire necessary e-mails only, which prevents excessively long processing time, wastage (useless consumption) of paper, toner/ink, etc., fast wearing of parts, etc. which can be caused by acquisition and printing of unnecessary e-mails.

History data regarding each e-mail already acquired (e-mail acquisition date/time, identification information on the acquired e-mail, etc.) is stored in the portable storage medium (USB memory 22). In the e-mail acquisition, unacquired e-mails are selected by referring to the history data and the selected e-mails (unacquired e-mails) are acquired from the mail server, which allows the user to acquire highly necessary e-mails only, which is especially convenient for the user.

The forwarding data, which is generated based on an acquired e-mail, can be forwarded to an external device by e-mail transmission, facsimile transmission, etc. and the forwarding data can be viewed at a different place, which is highly convenient. By storing the forwarding destination information in the USB memory 22, it becomes unnecessary to store the forwarding destination information in the printer 1, by which the security can be enhanced.

The forwarding data to be forwarded is generated by combining the acquired e-mail and the fixed text data. Thus, it is possible to add a character string for letting a user (referring to the forwarding data at the forwarding destination) easily recognize that the data is forwarding data of an e-mail, for example, to the e-mail, by which the user convenience is enhanced.

By managing the setting information (the name and address of the mail server 40, the user ID and password for the mail server 40, etc.) by storing the setting information not in the printer 1 but in the USB memory 22, the security can be enhanced significantly.

7. Modifications

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

(1) For example, while a USB memory is employed as a portable storage medium in the above embodiment, it is also possible to employ various other portable record media (e.g. memory card). Similarly, the connection with a portable storage medium may be implemented not only by a USB interface but also by various other interfaces. For example, it is possible to employ an interface capable of noncontact communication with a portable storage medium.

(2) While an access password is set for the USB memory in the above embodiment, the password input step may be left out when no access password is set for the portable storage medium (when files are not encrypted). Specifically, the authentication by manual password input, etc. is substantially essential for the e-mail acquisition in cases where the setting information is stored in a storage medium inside the printer. On the other hand, according to the present invention, the user authentication is completed by connecting a portable storage medium (storing the setting information) to the printer. Therefore, a certain level of security can be ensured even without the password input, etc.

(3) While the setting information and other information to be used for the e-mail acquisition are stored in a USB memory as the mail acquisition information in the above embodiment, it is also possible to previously store part of such information in a storage medium inside the printer and read out and use the stored information at the time of e-mail acquisition.

(4) While the target of the mail acquisition process (mail acquisition information) is selected by the user when multiple sets of mail acquisition information (setting information) exist in the USB memory in the above embodiment, it is also possible to leave out the selection step and automatically execute the mail acquisition process for all sets of mail acquisition information. Incidentally, the operation for selecting the setting information to be used for the e-mail acquisition is essential in cases where setting information for two or more people is stored in a storage medium inside the printer. However, the operation for selecting the setting information can be left out by carrying out the e-mail acquisition for all sets of setting information stored in a portable storage medium connected to the printer.

(5) The input of the instruction for executing the mail acquisition process, the selection of the processing target when there exist multiple sets of mail acquisition information, the selection of the mail selection method, etc. can be properly left out as needed, by which the processing time can be reduced. It is possible to let the user previously store information indicating whether each of such steps is necessary or not in a portable storage medium or in a storage medium inside the printer and to make the printer operate according to the information (in the portable storage medium or the storage medium) at the time of e-mail acquisition.

(6) It is possible to let the user select whether the body (or the attached file) of the acquired e-mail should be printed (or should be stored in the portable storage medium) or not. Such selection may be inputted to the printer by the user at the time of e-mail acquisition, or it is also possible to previously store information indicating the user's selection in a portable storage medium or in a storage medium inside the printer and make the printer operate according to the information (selection) at the time of e-mail acquisition.

(7) While the e-mails to be acquired are selected by using the identification information and the acquisition date/time of each e-mail as the filter information in the above embodiment, it is also possible to previously store a prescribed selection condition (for judging whether the sender corresponds to a particular address or not, or for judging whether the subject line includes a particular character string or not, for example) as the filter information and make the e-mail selection so as to acquire (or not to acquire) e-mails satisfying the selection condition.

What is claimed is:

1. A printing device comprising:
   a communication unit configured to execute communication with a mail server on a network;
   a connection unit configured to receive a connection with a portable storage medium;
   a printing unit configured to execute printing; and
   a control unit configured to execute a mail acquisition process of:
   acquiring an e-mail from the mail server via the communication unit, the e-mail including a body,
   judging whether a file is attached to the acquired e-mail,
   in response to determining that a file is attached to the acquired e-mail:
   generating a storing file based on the file attached to the acquired e-mail and independently of the body of the acquired e-mail, and
   storing the storing file in the portable storage medium when the portable storage medium is connected to the connection unit.

2. The printing device according to claim 1, wherein the control unit is further configured to read out image data stored in the portable storage medium and print an image based on the image data with the printing unit.

3. The printing device according to claim 1, wherein the control unit is further configured to detect the connection of the portable storage medium to the connection unit,
   wherein the control unit is configured to start at least part of the mail acquisition process in response to detecting the connection of the portable storage medium to the connection unit.

4. The printing device according to claim 1, wherein the control unit is further configured to
   create a folder having a folder name based on identification information on the acquired e-mail, and
   store the storing file in the folder in the storing of the storing file in the portable storage medium.

5. The printing device according to claim 4, wherein the control unit is further configured to:
   judge whether contents of the attached file are printable, and
   execute printing of the attached file with the printing unit when the contents of the attached file are judged to be printable.

6. The printing device according to claim 1, wherein the control unit is further configured to:
   judge whether the printing of the body is possible, and
   store the body in the portable storage medium without executing the printing of the body when the printing is judged to be impossible.

7. The printing device according to claim 6, wherein the control unit is further configured to:
   judge whether contents of the attached file are printable, and
   execute printing of the attached file with the printing unit when the contents of the attached file are judged to be printable.

8. The printing device according to claim 1, further comprising a selection unit configured to receive selection input specifying whether the e-mail acquired in the e-mail acquisition of the mail acquisition process is to be deleted from the mail server or retained in the mail server,
   wherein the control unit is further configured to instruct the mail server to delete or retain the acquired e-mail based on the selection input.

9. A non-transitory computer-readable record medium storing computer-readable instructions that cause a computer of a printing device, to execute:
   an e-mail acquisition step of acquiring an e-mail including a body from a mail server on a network via a communication unit of the printing device;
   a judging step of judging whether a file is attached to the acquired email;
   a generating step of generating a storing file based on the file attached to the acquired e-mail and independently of the body of the acquired e-mail in response to judging that a file is attached to the acquired email; and
   a file storing step of storing the storing file in a portable storage medium when the portable storage medium is connected to a connection unit of the printing device, wherein the connection unit is configured to receive a connection with the portable storage medium.

10. A printing device comprising:
    a communication unit configured to execute communication with a mail server on a network;
    a connection unit configured to receive a connection with a portable storage medium;
    a printing unit configured to execute printing; and
    a control unit configured to execute a mail acquisition process of:
    detecting the connection of the portable storage medium to the connection unit,
    acquiring an e-mail including a body and an attached file from the mail server via the communication unit, wherein the control unit is configured to start at least part of the acquiring of the e-mail in response to detecting the connection of the portable storage medium to the connection unit,
    printing the body with the printing unit, and
    storing the attached file in the portable storage medium connected to the connection unit.

11. A printing device comprising:
    a communication unit configured to execute communication with a mail server on a network;
    a connection unit configured to receive a connection with a portable storage medium;
    a printing unit configured to execute printing; and
    a control unit configured to execute a mail acquisition process of:
    acquiring an e-mail including a body and an attached file from the mail server via the communication unit,
    printing the body with the printing unit,
    creating a folder having a folder name based on identification information on the acquired e-mail, and
    storing the attached file in the folder in the portable storage medium when the portable storage medium is connected to the connection unit.

12. The printing device of claim 11, wherein the control unit is further configured to:
    judge whether contents of the attached file are printable, and
    execute printing of the attached file with the printing unit when the contents of the attached file are judged to be printable.

13. A printing device comprising:
    a communication unit configured to execute communication with a mail server on a network;
    a connection unit configured to receive a connection with a portable storage medium;
    a printing unit configured to execute printing;
    a control unit configured to execute a mail acquisition process of:

acquiring an e-mail including a body and an attached file from the mail server via the communication unit, printing the body with the printing unit, and storing the attached file in a portable storage medium when the portable storage medium is connected to the connection unit; and a selection unit configured to receive selection input specifying whether the e-mail acquired in the e-mail acquisition of the mail acquisition process is to be deleted from the mail server or retained in the mail server, wherein the control unit is further configured to instruct the mail server to delete or retain the acquired e-mail based on the selection input.

* * * * *